United States Patent Office 3,699,082
Patented Oct. 17, 1972

3,699,082
METHOD OF PROCESSING PREFORMED POLYESTER RESINS AND CONVERTING TO COATING MATERIALS
Ernest C. Koerner, Robert T. Trice, and William W. Wareham, Fort Wayne, Ind., assignors to Phelps Dodge Magnet Wire Corporation, Fort Wayne, Ind.
No Drawing. Filed July 7, 1969, Ser. No. 839,680
Int. Cl. C08g 22/06, 20/32, 17/14
U.S. Cl. 260—75 NK                                        18 Claims

ABSTRACT OF THE DISCLOSURE

A method of processing preformed polyester resin material, said method including the steps of reacting said resin material and selectively exchanging a portion of the ester groups of said resin material for other groups, including amide and/or imide groups and/or reacting said resin material to cause either cross-linking and/or trans-esterification of said material. Specifically, in accordance with the method of this invention, a preformed thermoplastic linear poly (ethylene terephthalate) polyester resin material can be transformed into a thermosettable polyester resin material or polyamide-ester, polyimide-ester or polyamide-imide-ester resin materials, which may be either thermoplastic or thermosettable resin materials.

BACKGROUND OF THE INVENTION

Field of the invention

This invention relates to a method of processing polyester resins, and more specifically, a method of manufacturing thermosettable polyester resin materials or polyamide-ester, polyimide-ester or polyamide-imide-ester materials from preformed essentially linear polyester materials. This invention also relates to a method of improving the chemical, physical and electrical properties of preformed essentially linear polyester resin materials and the application of polyamide-ester, polyimide-ester and polyamide-imide-ester resin materials, or other modified polyester resin materials to articles, for example, electrical conductors, as a coating thereon.

Description of the prior art

Thermoplastic, essentially linear polyester resin materials have long been available. Such resin materials have heretofore been used as coatings on articles, for example, electrical conductors (see U.S. Pat. No. 3,022,200). Also, such polyester resin materials have heretofore been modified to produce thermosettable polyester resin materials and polyester resin materials in which a portion of the ester groups have been replaced by other groups. These resin materials are referred to herein as "modified polyester resin materials." Such materials have heretofore been disclosed as suitable for application to articles as coatings, for example, magnet wire insulation (see U.S. Pat. No. 3,342,780 and Canadian Pat. No. 771,126). These modified polyester resin materials include those materials referred to herein as "thermosettable polyester resin materials," "polyamide-ester resin materials," "polyimide-ester resin materials" and "polyamide-imide-ester resin materials."

For the most part such polyester resin materials have been manufactured from (1) either terephthalic or isophthalic acid, (2) a diol, for example, ethylene glycol, and (3) a polyhydric alcohol having at least three hydroxyl groups, for example, glycerine. The patents above-mentioned disclose various modified polyester materials. However, for the most part, those too have been manufactured from monomers including those above-listed. Other methods for preparing polyester resin materials are not widely used.

One method of manufacturing polyester resin materials of the thermosettable type above-described is to process preformed thermoplastic linear polyester resin material with glycerin. Such a method is disclosed in Russian Pat. No. 125,382. This method is highly advantageous since it may utilize polyester resin material such as that sold under the trademarks "Dacron" and "Mylar" by the Du Pont de Nemours Company and that identified as VFR–700A polyester resin material by The Goodyear Tire and Rubber Company, Inc. which has been classified as scrap or off-grade material. Such material is inexpensive and plentiful. However, certain modified polyester resin materials, including thermosettable polyester resin material cross-linked with isocyanates or isocyanurates, and polyamide-ester resin, polyimide-ester resin and polyamide-imide-ester resin materials cannot be manufactured from preformed polyester resin materials by the method disclosed in Russian Pat. No. 125,382. It is therefore highly desirable to provide a method of manufacturing such modified polyester resin materials from preformed polyester resin materials.

SUMMARY OF THE INVENTION

It is therefore the primary object of this invention to provide an improved method of processing polyester resin materials.

Another object of this invention is to provide an improved method of manufacturing modified polyester resin materials.

Another object of this invention is to provide an improved method of manufacturing magnet wire enamels comprising polyester resin materials.

Another object of this invention is to provide an improved method of processing polyester resin materials to improve the properties thereof.

Yet another object of this invention is to provide an improved method of modifying preformed essentially linear polyester resin materials to form thermosettable polyester resin materials or polyamide-ester resin, polyimide-ester resin or polyamide-imide-ester resin materials.

A further object of this invention is to provide an improved method of making modified polyester resin materials including thermosettable resin materials and polyamide-ester resin, polyimide-ester resin and polyamide-imide-ester resin materials from preformed thermoplastic essentially linear polyester resin materials, for example, poly(ethylene terephthalate).

Still further an object of this invention is to provide an improved method of making modified polyester resin materials including thermosettable resin materials and polyamide-ester resin, polyimide-ester resin and polyamide-imide ester resin materials from preformed thermoplastic essentially linear polyester resin materials, for example poly(ethylene terephthalate), forming a solution thereof and applying a coat of the same to an article, for example, a copper conductor, thereby forming a coated article, for example, a magnet wire.

In the broader aspects of this invention there is provided a method comprising the steps of reacting a preformed thermoplastic essentially linear polyester resin material with a diol thereby forming a reaction product having ester groups and hydroxyl groups therein, and either (1) exchanging a portion of said ester groups for groups selected from the group consisting of amide and imide containing groups and groups containing amide and imide precursors or (2) reacting said reaction product with a compound having at least three reactive groups thereby forming a thermosettable polyester resin.

DESCRIPTION OF THE PREFERRED EMBODIMENT

In accordance with the present invention, preformed polyester resin materials are reacted with diols to form a reaction product, in accordance with the equation:

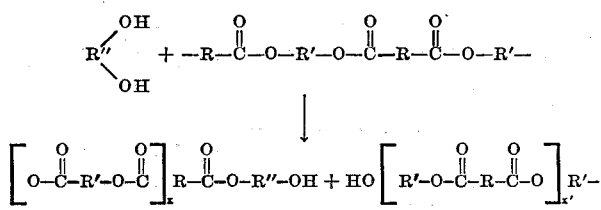

where R, R' and R" are multivalent hydrocarbon radicals and $x'$ and $x'$ are integers, i.e. 1, 2, 3, etc.

By alcoholysis of the polyester resin material in accordance with the above formulas, the resin material is broken into shorter chain lengths having the formulas last appearing hereinabove. The average length of these chain lengths, i.e., the value of $x$ in the formula, of this reaction product, can be varied by varying the molar ratio of diol to resin material. Generally, it has been found that if more than 15 moles of diol are used in reacting a single mole of polyester resin material, the synthesis of the resin material via coupling reactions hereinafter mentioned may be slower than desired and the resulting modified polyester may lack the desired thermal stability.

In a specific embodiment in which the polyester resin material is a poly(ethylene terephthalate), 1,4 butanediol is used to react with the resin material. However, the specific diols used are chosen because of their molecular weight, boiling point, availability and cost, and the desired properties of the resulting modified polyester material, i.e., flexibility. Generally, any diol having a molecular weight larger than the diol forming a part of the preformed resin material can be used. Preferred results have been achieved by using a diol having a molecular weight substantially larger than the diol of the preformed resin material.

The reaction product resulting from the treatment of the polyester resin material with diols can then be reacted with a variety of reactants, there being reactive ester groups and hydroxyl groups in each of the chain lengths of the reaction product, and the chain lengths of the reaction product can be coupled together to form a great variety of modified polyester resin materials.

For example, the reactive hydroxyl groups permit reaction between the reaction product and isocyanates and the like including isocyanates such as p,p'-diphenylmethane diisocyanate and tris (toluylene isocyanate) isocyanurate and any other isocyanates which may be desirable. Similarly, the reactive ester groups permit reaction between the reaction product and amines and alcohols and the like. Such reactions with amines will result in the formation of amide groups in the polyester resin material forming polyamide-ester resin materials.

By reacting compounds having more than one reactive group, i.e., diamines, additional reactive groups are added to the chain lengths of the reaction product. These additional reactive groups may result in the coupling of the chain lengths or permitting additional reactions to occur, for example, with carboxylic acids or the acid anhydrides thereof and the formation of either polyimide-ester resin materials or polyamide-imide-ester resin materials. Specifically, reactions with diamines and tricarboxylic acids or acid anhydrides wherein the molar ratio of tricarboxylic acid or acid anhydride to diamine is at least two to one (see Table II, Examples VIII, XI and XIV) form polyimide-ester resin materials and wherein the molar ratio of tricarboxylic acid or acid anhydride to diamine is less than two to one (see Table II, Examples IX, X, XII, XIII, XV and XVI) form polyamide-imide-ester resin materials. These examples illustrate the versatility of the method disclosed.

Further, the transesterification of the reaction product by reacting alcohols with the chain lengths of the reaction product is also possible. In a specific embodiment, the reaction of the reaction product with an isocyanate or the like such as those above-mentioned or the transesterification of the reaction product with an alcohol having more than two hydroxyl groups are preferred to couple the chain lengths of the reaction product into the desired modified polyester resin material. In a specific embodiment, such alcohols include glycerine, tris(2-hydroxyethyl) isocyanurate, and pentaerythritol. However, cross linking can be achieved by reacting the reaction product with any compound having more than two reactive groups such as those above-mentioned.

Other reactions between a variety of reactants and the polyester resin reaction product above-described are possible. While specific reactions, reactants, and reaction products are described herein, it should be understood that it is the intention to disclose and claim as a part of the invention all methods of processing all polyester resin materials such as those above-described, which use reactants and reactions and produce reaction products chemically similar to those above-described, and all modified polyester resin materials which can be formed in accordance with the method hereinabove disclosed.

The following examples will illustrate the present invention. Each of the reactions involving polyethylene terephthalate was carried out in a nitrogen atmosphere.

EXAMPLE I

A solution is formed by dissolving 200.0 grams of tris (toluylene isocyanate) isocyanurate (Mondur SH resin, as sold by Mobay Chemical Company) in 850.0 grams of a cresylic acid solution consisting of 50% weight cresylic acid (Pitt-Consol #9 solvent, as sold by Pitt-Consol Company) and 50% weight phenol and 255.0 grams of an aromatic solvent (Solvesso 100 solvent, as sold by Hoosier Solvents and Chemicals Corp.), at room temperature by mixing the same by stirring until a homogeneous solution is formed.

A second solution is formed by mixing 580.0 grams of scrap polyethylene terephthalate material, 34.0 grams of 1,4-butanediol and 60 grams of an aromatic solvent (NJ-150 solvent, as sold by Hoosier Solvents and Chemicals Corp.). The specific polyester used in this example is scrap, off-grade, polyethylene terephthalate material (VFR-700A resin material, as obtained from The Goodyear Tire and Rubber Company, Inc.). The mixture is heated in a nitrogen atmosphere and stirred until a uniform mixture is obtained. Usually, stirring for about an hour is necessary to obtain a uniform mixture. The solution temperature is raised to a temperature from about 235° C. to about 260° C. and refluxed. About 31 to about 33 grams of ethylene glycol and water is removed by distillation from the mixture as the solution is being refluxed. Refluxing is continued until all of the displaced glycol and reaction water is removed from the mixture.

The mixture is then cooled to about 220° C. and the tris (toluylene isocyanate) isocyanurate solution mentioned hereinabove is added to the mixture. The resulting mixture is then cooled to a temperature from about 137° C. to about 145° C. and stirred at that emperature for about 2½ hours. The viscosity of the mixture rises considerably during this 2½ hour period. The nitrogen atmosphere is removed and the resulting solution is then diluted by adding to the solution a cresylic acid solution consisting essentially of 75% weight cresylic acid (Pitt- Consol #9 solvent, as sold by Pitt-Consol Company) and 25% weight aromatic solvent (Solvesso 100 solvent, as sold by Hoosier Solvents and Chemicals Corp.) until the solution has a viscosity of about 2250 cps. at about 36° C. as measured by a Brookfield viscometer.

The resultant wire enamel was then applied to a bare copper conductor having no insulation thereon employing dies and a conventional wire coating tower at 33 feet per minute, having bank temperatures of 800° F., 700° F. and 600° F., respectively. Six coats were applied in this manner.

The properties of the resultant magnet wire are shown in Table I as compared to a bare copper conductor having six coats of modified polyester resin (8607H polyester wire enamel, as sold by Schenectady Chemicals, Inc.) in the same manner as above-described.

EXAMPLE II

A solution is formed by dissolving 402.0 grams of tris (toluylene isocyanate) isocyanurate (Mondur SH resin, as sold by Mobay Chemical Company) in 302.0 grams of a cresylic acid solution essentially consisting of 50% weight cresylic acid (Pitt-Consol #9 solvent, as sold by Pitt-Consol Company) and 50% weight phenol and 100.0 grams of an aromatic solvent (Solvesso 100 solvent, as sold by Hoosier Solvents and Chemicals Corp.), at room temperature by mixing the same by stirring until a homogeneous solution is formed.

A second solution is formed by mixing 768.0 grams of scrap polyethylene terephthalate material, 67.5 grams of 1,4-butanediol, 99.0 grams of methylene dianiline and 60.0 grams of an aromatic solvent (NJ–150 solvent, as sold by Hoosier Solvents and Chemicals Corp.). The specific polyester material used in this example is scrap, off-grade polyethylene terephthalate material (VFR–700A resin material, as obtained from The Goodyear Tire and Rubber Company, Inc.). The mixture is heated in a nitrogen atmosphere and stirred until a uniform mixture is obtained. Usually, stirring for about an hour is necessary to obtain a uniform mixture. The solution temperature is raised to a temperature from about 235° C. to about 260° C. and refluxed. About 31 to about 33 grams of ethylene glycol and water is removed by distillation from the mixture as the solution is being refluxed. Refluxing is continued until all of the glycol and water is removed from the mixture.

The mixture is then cooled to about 220° C. and 700.0 grams of the cresylic acid solution above-identified and 175.0 grams of an aromatic solvent (Solvesso 100 solvent, as sold by Hoosier Solvents and Chemicals Corp.) are added to the mixture. The mixture should be a homogeneous solution of the ingredients at this time and all of the resin should be in solution.

The solution is then cooled to about 120° C. and the tris (toluylene isocyanate) isocyanurate solution mentioned hereinabove is added to the mixture. The resulting mixture is then heated to a temperature from about 137° C. to about 145° C. and stirred for about 30 minutes. The resulting solution is relatively thick. This solution is removed from the nitrogen atmosphere and diluted by adding 230.0 grams of a cresylic acid solution above-identified and 110.0 grams of an aromatic solvent (Solvesso 100 solvent, as sold by Hoosier Solvents and Chemicals Corp.) to each 500.0 grams of the resulting thick solution. The resulting wire enamel has a viscosity of about 1900 cps. at 30° C. as measured by a Brookfield viscometer and is about 30% weight resin and about 70% weight solvent.

The resultant wire enamel was applied to a bare copper conductor having no insulation thereon employing dies and a conventional wire coating tower at 33 feet per minute, having bank temperatures of 825° F., 725° F., and 625° F., respectively. Six coats were applied in this manner.

The properties of the resultant magnet wire are shown in Table I as compared to a bare copper conductor having six coats of modified polyester resin (8607H polyester wire enamel, as sold by Schenectady Chemicals, Inc.) in the same manner as above described.

EXAMPLE III

A solution is formed by mixing 768.0 grams of scrap polyethylene terephthalate material, and 38.0 grams of 1,4-butanediol. The specific polyester material used in this example, is scrap, off-grade, polyethylene terephthalate material (VFR–700A resin material, as obtained from The Goodyear Tire and Rubber Company, Inc.). The mixture is heated in a nitrogen atmosphere. The mixture is constantly stirred as the temperature increases. The solution becomes clear and homogeneous after about 30 to about 60 minutes of stirring and the solution temperature is from about 190° C. to about 210° C. About 60.0 grams of an aromatic solvent (NJ–150 solvent, as sold by Hoosier Solvents and Chemicals Corp.) is added to the resultant solution. The mixture is stirred and maintained in an atmosphere of nitrogen gas for about 1 hour. The stirring of the resultant solution is then stopped and 271.6 grams of tris (2 - hydroxyethyl) isocyanurate and 4.03 grams of antimony oxide (KR Grade Antimony Oxide, as sold by Harshaw Chemical Company) is added to and quickly stirred into the solution. The solution is continuously stirred and the solution temperature is maintained at about 200° C. in the nitrogen atmosphere until the solution appears completely homogeneous. The solution is stirred and the solution temperature is maintained at about 200° C. for about 10 minutes after the solution appears homogeneous. Then, the stirring of the solution is stopped and an additional 250.0 grams of tris (2-hydroxyethyl) isocyanurate is added to and quickly stirred into the solution. The solution is continuously stirred and the solution temperature is maintained at about 200° C. until the solution once again appears completely homogeneous. The solution temperature is maintained at about 200° C. and the solution is continuously stirred for about 70 minutes after the solution appears homogeneous. During this period of time the temperature is maintained at about 200° C. The solution will remain cloudy because of the unreacted antimony oxide.

The temperature of the resultant solution is then raised to about 215° C. and ethylene glycol and water are extracted from the solution by distillation. The ethylene glycol and water are distilled from the solution in this manner for about 1 hour. The temperature of the solution is then raised to a temperature from about 232° C. to about 245° C. and additional ethylene glycol and water are distilled from the solution for an additional 1 hour. A total of about 95 cc. of ethylene glycol is extracted from the solution in this manner. The solution is continuously stirred as the ethylene glycol is distilled. The resultant solution is cooled to about 180° C., removed from the nitrogen atmosphere and diluted by adding 1000.0 grams of a cresylic acid solution consisting of 50% weight cresylic acid (Pitt-Consol #9 solvent, as sold by Pitt-Consol Company) and 50% weight phenol. The resultant solution is then further diluted and curing additives are added.

The resulting wire enamel was then applied to a bare copper conductor having no insulation thereon employing dies and a conventional wire coating tower at 33 feet per minute and having bank temperatures of 850° F., 800° F., and 600° F., respectively. Six coats were applied in this manner.

The wire enamel applied in the manner above-described was about 30% weight resin and about 70% weight solvent. A specific wire enamel possessing the viscosity of about 1210 cps. at about 30° C. as measured by a Brookfield viscometer is formed by adding to the last-mentioned solution consisting essentially of about 1167 grams of polyester resin, about 60 grams of an aromatic solvent (NJ–150 solvent, as sold by Hoosier Solvents and Chemicals Corp.) anl about 1000 grams of the cresylic acid solution above-identified, additional solvent consisting essentially of 620.7 grams of an aromatic solvent (NJ–100 solvent, as sold by Hoosier Solvents and Chemicals Corp.) and 1042.1 grams of the cresylic acid solution above-identified. Also, 11.67 grams of a curing additive, butyl titanate (Tyzor PB (100%) solution, as sold by E. I. du Pont de Nemours Company, Inc.) and 58.35 grams of a cross-linking agent, a phenolic resin solution (RS–228 (55%) solution, as sold by Monsanto Company) were added to the solution. The above-mentioned wire enamel having a viscosity of 2500 cps. at 30° C. as measured by a Brookfield viscometer (see Table I) was diluted identically to that above-described except that less additional solvent (consisting essentially of the same proportions of the aromatic solvent and the cresylic acid solution above-described) was added. The same amounts of the curing additive and cross-linking agent were added in each case.

The properties of the resultant magnet wire are shown in Table I as compared to a bare copper conductor having six coats of modified polyester resin (8607H polyester wire enamel, as sold by Schenectady Chemicals, Inc.) in the same manner as above-described.

EXAMPLE IV

A solution in formed by mixing 192.0 grams of scrap polyethylene terephthalate material and 15.0 grams of 1,4-butanediol. The specific polyester material used in this example is scrap, off-grade, polyethylene terephthalate material (VFR–700A resin material, as obtained from The Goodyear Tire and Rubber Company, Inc.). The mixture is heated in a nitrogen atmosphere. The mixture is constantly stirred as the temperature increases. The solution becomes clear and homogeneous after about 30 to about 60 minutes of stirring and when the solution temperature is from about 190° C. to about 210° C.

The resulting solution is maintained in an atmosphere of nitrogen gas and continually stirred for about 10 minutes. The stirring of the resultant solution is then stopped and 21.8 grams of tris (2-hydroxyethyl) isocyanurate and 0.64 gram of antimony oxide (KR Grade Antimony Oxide, as sold by Harshaw Chemical Company) is added and quickly stirred into the solution. The solution is continually stirred and the solution temperature is maintained at about 200° C. in the nitrogen atmosphere until the solution is completely homogeneous, and then for about 10 minutes after the solution appears homogeneous. Then, the stirring of the solution is stopped and an additional 21.8 grams of tris (2-hydroxyethyl) isocyanurate and 0.64 gram of antimony oxide (KR Grade Antimony Oxide, as sold by Harshaw Chemical Company) is added to and quickly stirred into the solution. The solution is continuously stirred and the solution temperature is maintained at about 200° C. in the nitrogen atmosphere until the solution again appears completely homogeneous, and then, for about 10 minutes after the solution appears homogeneous. Then, the stirring of the solution is stopped and an additional 21.8 grams of tris (2-hydroxyethyl) isocyanurate and 0.64 gram of antimony oxide (KR Grade Antimony Oxide, as sold by Harshaw Chemical Company) is added to and quickly stirred into the solution. The solution is continuously stirred and the solution temperature is maintained at about 200° C. in the nitrogen atmosphere until the solution appears completely homogeneous, and then, for about ten minutes after the solution appears homogeneous. Generally, after each addition of tris (2-hydroxyethyl) isocyanurate above-mentioned, the solution should appear to be completely homogeneous in about 60 minutes.

About 15.0 grams of an aromatic solvent (NJ–150 solvent, as sold by Hoosier Solvents and Chemicals Corp.) is added to the resultant solution. The mixture is continuously stirred in the nitrogen atmosphere and the solution temperature is maintained at about 200° C. for about 1 hour. The solution will remain cloudy because of the unreacted antimony oxide.

The temperature of the resultant solution is then raised to about 215° C. and ethylene glycol and water are extracted from the solution by distillation. The ethylene glycol and water are distilled from the solution in this manner for about 1 hour. Then the temperature of the solution is raised to a temperature not exceeding 245° C. and additional ethylene glycol and water are distilled from the solution for an additional 2 hours. The solution is continually stirred as the ethylene glycol is distilled. About 20 grams of ethylene glycol is extracted from the solution during this three hour period. The resultant solution is cooled to about 180° C. and diluted.

The resulting solution is removed from the nitrogen atmosphere and diluted by adding 262.5 grams of cresylic acid (Pitt-Consol #9 solvent, as sold by Pitt-Consol Company), 262.5 grams phenol and 175 grams of aromatic solvent (NJ–100 solvent, as sold by Hoosier Solvents and Chemicals Corp.) to each 300 grams of the resulting solution. The mixture is stirred well and may be heated to a temperature not exceeding 75° C. until the resin is dissolved and the resulting solution is completely homogeneous. The resulting solution is then cooled to room temperature and 3.0 grams of a curing agent, butyl titanate (Tyzor PB (100%) solution, as sold by E. I. du Pont de Nemours Company, Inc.) and 15.0 grams of a cross-linking agent, a phenolic resin solution (RS–228 (55%) solution, as sold by Monsanto Company) are added to the solution. The resulting wire enamel was filtered.

The wire enamel was then applied to a bare copper conductor having no insulation thereon employing dies and the conventional wire coating tower at 33 feet per minute having bank temperatures of 850° F., 800° F., and 600° F., respectively. Six coats were applied in this manner.

EXAMPLE V

A solution is formed by mixing 768.0 grams of scrap polyethylene terephthalate material, and 50.0 grams of 1,4-butanediol. The specific polyester material used in this example is scrap, off-grade, polyethylene terephthalate material (VFR–700A resin material, as obtained from The Goodyear Tire and Rubber Company, Inc.). The mixture is heated in a nitrogen atmosphere. The mixture is constantly stirred as the temperature increases. The solution becomes clear and homogeneous after about 30 to about 60 minutes of stirring and when the solution temperature is from about 190° C. to about 210° C.

The resulting solution is maintained in an atmosphere of nitrogen gas and continually stirred for about 10 minutes. The stirring of the resultant solution is then stopped and 173.9 grams of tris (2-hydroxyethyl) isocyanurate and 3.22 grams of antimony oxide (KR Grade Antimony Oxide, as sold by Harshaw Chemical Company) is added and quickly stirred into the solution. The solution is continually stirred and the solution temperature is maintained at about 200° C. in the nitrogen atmosphere until the solution is completely homogeneous, and then, for about 10 minutes after the solution appears homogeneous. Then, the stirring of the solution is stopped and an additional 173.9 grams of tris(2-hydroxyethyl) isocyanurate is added to and quickly stirred into the solution. The solution is continuously stirred and the solution temperature is maintained at about 200° C. in the nitrogen atmosphere until the solution appears completely homogeneous, and then, for about 10 minutes after the solution appears homogeneous. Then, the stirring of the solution is stopped and an additional 173.9 grams of tris(2 - hydroxyethyl) isocyanurate is added to and quickly stirred into the solution. The solution is continuously stirred and the solution temperature is maintained at about 200° C. in the nitrogen atmosphere until the solution appears completely homogeneous, and then, for about ten minutes after the solution appears homogeneous. Generally, after each addition of tris (2 - hydroxyethyl) isocyanurate above-mentioned, the solution should appear to be completely homogeneous in about 60 minutes.

About 60.0 grams of an aromatic solvent (NJ–150 solvent, as sold by Hoosier Solvents and Chemicals Corp.) is added to the resultant solution. The mixture is continuously stirred in the nitrogen atmosphere and the solution temperature is maintained at about 200° C. for about 1 hour. The solution will remain cloudy because of the unreacted antimony oxide.

The temperature of the resultant solution is then raised to about 215° C. and ethylene glycol and water are extracted from the solution by distillation. The ethylene glycol and water are distilled from the solution in this manner for about 1 hour. Then the temperature of the solution is raised to a temperature not exceeding 245° C. and additional ethylene glycol and water are distilled from the solution for an additional 2 hours. The solution is continually stirred as the ethylene glycol and water are distilled. About 90 grams of ethylene glycol is extracted from the solution during this three hour period. The resultant solution is cooled to about 180° C. and diluted.

The resulting solution is removed from the nitrogen atmosphere and diluted by adding 262.5 grams of cresylic acid (Pitt-Consol #9 solvent, as sold by Pitt-Control Company), 262.5 grams phenol and 175 grams of aromatic solvent (NJ–100 solvent, as sold by Hoosier Solvents and Chemicals Corp.) to each 300 grams of the resulting solution. The mixture is stirred well and may be heated to a temperature not exceeding 75° C. until the resin is dissolved and the resulting solution is completely homogeneous. The resulting solution is then cooled to room temperature and 3.0 grams of a curing agent, butyl titanate (Tyzor PB (100%) solution, as sold by E. I. du Pont de Nemours Company, Inc.) and 15.0 grams of a cross-linking agent, a phenolic solution (RS–228 (55%) solution, as sold by Monsanto Company) are added to the solution. The resulting wire enamel was filtered.

The wire enamel was then applied to a bare copper conductor having no insulation thereon employing dies and the conventional wire coating tower at 33 feet per minute having bank temperatures of 850° F., 800° F., and 600° F., respectively. Six coats were applied in this manner.

EXAMPLE VI

A solution is formed by mixing 768.0 grams of scrap polyethylene terephthalate material and 38.0 grams of 1,4-butanediol. The specific polyester material used in this example is scrap, off-grade, polyethylene terephthalate material (VFR–700A resin material, as obtained from The Goodyear Tire and Rubber Company, Inc.). The mixture is heated in a nitrogen atmosphere. The mixture is constantly stirred as the temperature increases. The solution becomes clear and homogeneous after about 30 to about 60 minutes of stirring and the solution temperature is from about 190° C. to about 210° C.

Then 60.0 grams of an aromatic solvent (NJ–150 solvent, as sold by Hoosier Solvents and Chemicals Corp.) is added to the resultant solution. The mixture is stirred and maintained in an atmosphere of nitrogen gas for about 1 hour. After about 50 minutes of the hour has elapsed, 19.5 grams of methylene dianiline is added to the solution as the solution is being stirred. After the 1 hour period has elapsed, 37.8 grams of trimellitic anhydride is added to the solution and the solution is continuously stirred for an additional 1 hour period. During this last-mentioned hour period, the solution temperature is maintained at about 200° C. and as much water and ethylene glycol are removed from the solution by distillation as possible. In this example, about 12 cc. of reaction water was obtained in this manner.

The stirring of the resultant solution is then stopped and 271.6 grams of tris(2-hydroxyethyl) isocyanurate and 4.03 grams of antimony oxide (KR Grade Antimony Oxide, as sold by Harshaw Chemical Company) is added to and quickly stirred into the solution. The solution is continuously stirred and the solution temperature is maintained at about 200° C. in the nitrogen atmosphere until the solution appears completely homogeneous. The solution is stirred and the solution temperature is maintained at about 200° C. for about 10 minutes after the solution appears homogeneous. Then, the stirring of the solution is again stopped and an additional 250.0 grams of tris(2-hydroxyethyl) isocyanurate is added to and quickly stirred into the solution. The solution is continuously stirred and the solution temperature is maintained at about 200° C. until the solution once again appears completely homogeneous; and then, the solution temperature is maintained and the stirring is continued for about 70 minutes. The solution will remain cloudy because of the unreacted antimony oxide.

The temperature of the resultant solution is then raised to about 215° C. and ethylene glycol and water are once again extracted from the solution by distillation. The ethylene glycol and water are distilled from the solution in this manner for about one hour. The temperature of the solution is then raised to a temperature from about 232° C. to about 245° C. for an additional one hour and additional ethylene glycol and water are distilled from the solution in this manner. A total of about 90 cc. of ethylene glycol extracted from the solution during this two hour period. The solution is continuously stirred as the ethylene glycol is distilled from the solution.

The resultant solution is removed from the nitrogen atmosphere and cooled to about 200° C. and diluted by adding 1000.0 grams of cresylic acid solution consisting of 50% weight cresylic acid (Pitt-Consol #9 solvent, as sold by Pitt-Consol Company) and 50% weight phenol. The resultant solution is then cooled to a temperature not exceeding 100° C. and additional solvent and curing and cross-linking agents are added to the solution.

Several wire enamels each having different viscosities and different ratios of resin to solvent were applied to a bare copper conductor having no insulation thereon employing dies and a conventional wire coating tower at 33 feet per minute and having bank temperatures of 850° F., 800° F. and 600° F., respectively. Six coats were applied in this manner.

The properties of a specific magnet wire made in accordance with the method of this example are shown in Table I as compared to a bare copper conductor having six coats of modified polyester resin (8607H polyester wire enamel, as sold by Schenectady Chemicals, Inc.) applied in the same manner.

The wire enamel used to make the specific magnet wire above-mentioned having a viscosity of about 3300 cps. at about 30° C. as measured by a Brookfield viscometer and being about 30% weight resin and about 70% weight solvent, was formed by adding to a portion of the last-mentioned solution consisting essentially of about 1287.1 grams of polyester resin, about 60 grams of an aromatic solvent (NJ–150 solvent, as sold by Hoosier Solvents and Chemicals Corp.) and about 1000 grams of the cresylic acid solution above-identified, additional solvent consisting essentially of 1252.4 grams of the cresylic acid solution above-identified and 690.8 grams of an aromatic solvent (NJ–100 solvent, as sold by Hoosier Solvents and Chemicals Corp.). Also 12.9 grams of a curing agent, butyl titanate (Tyzor PB (100%) solution, as sold by E. I. du Pont de Nemours Company, Inc.) and 94.4 grams of a cross-linking agent, a phenolic resin solution (RS–228 (55%) solution, as sold by Monsanto Company) were added to the solution. Other wire enamels can be made from the solution above-mentioned by diluting the solution identically to that above-described except that more or less additional solvent (consisting essentially of the same proportions of aromatic solvent and the cresylic acid solution above-described) was added. In all cases, approximately the same amounts of the curing and cross-linking agents are added.

EXAMPLE VII

A solution was formed by mixing 294.0 grams of scrap polyethylene terephthalate material and 18.0 grams of 1,4-butanediol. The specific polyester material used in this example is scrap, off-grade, polyethylene terephthalate material (VFR-700A resin material, as obtained from The Goodyear Tire and Rubber Company, Inc.). The mixture is heated in a nitrogen atmosphere. The mixture is constantly stirred as the temperature increases. The solution becomes clear and homogeneous after about 30 to about 60 minutes of stirring and the solution temperature is from about 190° C. to about 200° C. Then, 60.0 grams of an aromatic solvent (NJ-150 solvent, as sold by Hoosier Solvents and Chemicals Corp.) is added to the solution. The mixture is maintained in an atmosphere of nitrogen gas and stirred for about 15 minutes. Then, 120.0 grams of trimellitic anhydride is added to the solution by adding three separate 40 gram portions to the solution, allowing the anhydride to melt and any foaming of the solution to subside between each addition. Then, 60.0 grams of methylene dianiline is added to the solution by adding three separate 20 gram portions to the solution, allowing the dianiline to melt and any foaming of the solution to subside between each addition, and extracting condensate between each addition. During this period the solution temperature is maintained at no less than about 200° C. in the nitrogen atmosphere and as much water and ethylene glycol are removed from the solution by distillation as possible. In this example, about 12 cc. of reaction water was obtained in this manner.

Stirring of the resultant solution is then stopped and 126.0 grams of tris(2-hydroxyethyl) isocyanurate and 1.34 grams of antimony oxide (KR Grade Antimony Oxide, as sold by Harshaw Chemical Company) is added to and quickly stirred into the solution. The solution is continuously stirred and the solution temperature is maintained at about 200° C. in the nitrogen atmosphere until the solution appears completely homogeneous. The solution is then stirred and the solution temperature is maintained at about 200° C. for an additional ten minutes. The solution will remain cloudy because of the unreacted antimony oxide. The addition of the tris(2-hydroxyethyl) isocyanurate and antimony oxide, in this example, took about 70 minutes.

Ethylene glycol and water are once again extracted from the solution by distillation for about 1 hour. The solution is continuously stirred during distillation. An additional 18.0 grams of reaction water and ethylene glycol is extracted in this manner.

The resultant solution is removed from the nitrogen atmosphere, cooled to 100° C. and diluted by adding 1,050 grams of cresylic acid solution consisting of 50% weight cresylic acid (Pitt-Consol #9 solvent, as sold by Pitt-Consol Company) and 50% weight phenol and 290.0 grams of an aromatic solvent (NJ-100 solvent, as sold by Hoosier Solvents and Chemicals Corp.). The resultant solution is then cooled to a temperature not exceeding 100° C. and additional solvent and curing and cross-linking agents are added to the solution.

Several wire enamels each having different viscosities and different ratios of resin to solvent were applied to a bare copper conductor having no insulation thereon employing dies in a conventional wire coating tower at 33 feet per minute and having bank temperatures of 850° F., 800° F., and 600° F., respectively. Six coats were applied in this manner.

The properties of a specific magnet wire made in accordance with the method of this example are shown in Table I as compared to a bare copper conductor having six coats of modified polyester resin (8607H polyester wire enamel, as sold by Schenectady Chemicals, Inc.) applied in the same manner.

The specific wire enamel used to make the specific magnet wire above-mentioned, having a viscosity of about 880 cps. at about 30° C. as measured by a Brookfield viscometer and being about 30% weight resin and about 70% weight solvent, was formed by adding to a portion of the last-mentioned solution consisting essentially of 600 grams of polyester-resin, about 60 grams of an aromatic solvent (NJ-150 solvent, as sold by Hoosier Solvents and Chemicals Corp.) about 1000 grams of the cresylic acid solution above-identified, and about 290 grams of an aromatic solvent (NJ-100 solvent, as sold by Hoosier Solvents and Chemicals Corp.), 6.0 grams of a curing agent, butyl titanate (Tyzor PB (100%) solution, as sold by E. I. du Pont de Nemours Company, Inc.) and 30.0 grams of a cross-linking agent, a phenolic resin solution (RS-228 (55%) solution, as sold by Monsanto Company).

EXAMPLES VIII THROUGH XIX

Examples VIII through XIX may be performed in accordance with Example VII. The respective amounts of the ingredients are listed in Table II. Example XIX includes a material which the other examples do not include. This material, polyhydantoin resin (LK2217 (30%) resin solution, as sold by Farbenfabriken Bayer Aktiengesellschaft, Leverkusen, Germany) is added at the same time as the curing and cross-linking agents are added.

The properties of specific magnet wire made in accordance with Examples VIII through XIX are shown in Table III as compared to a bare copper conductor having six coats of a conventional wire enamel thought to be a polyamide-imide-ester material (Omega wire enamel, as sold by Westinghouse Electric Corporation), and a bare copper conductor having six coats of a conventional polyimide-ester material (Isomid wire enamel, as sold by Schenectady Chemicals, Inc.) applied in the same manner.

TABLE I

|  |  |  |  |  |  | Standard |
|---|---|---|---|---|---|---|
| Speed, ft./min | 33 | 33 | 33 | 33 | 33 | 33 |
| Enamel, example | I | II | III | VI | VII | 8607H |
| Viscosity, cps | [1] 2,250 | [1] 1,900 | [2] 2,500 | [2] 3,300 | [2] 880 | [2] 300 |
| Solids, percent | 30 | 30 | 30 | 30 | 30 | 31 |
| Surface rating | 1.5 | 1.1 | 1.3 | 1.1 | 1.1-1.2 | 1.3 |
| Build, mils | 3.2-3.3 | 3.0-3.1 | 3.1-3.2 | 2.9-3.2 | 3.1-3.3 | 2.7-3.0 |
| Flexibility: |  |  |  |  |  |  |
| Elongation, percent | 35 | 36 | 34 | 34 | 34 | 33 |
| Mandrel flex. percent IX | 20 | 25 | 25 | 25 | 25 | 25 |
| Snap | Pass | Pass | Pass | Pass | Pass | Pass |
| Heat shock: 20%-3X, ° C | [3] 175 | [3] 200 |  | [4] 175 | [5] 175 | [4] 175 |
| Reliance 40 a. burnout, min | 0.6 | 1.4 | 1.6 | 1.8 | 2.4 | 1.4 |
| NEMA cut-thru, ° C | 241 | 239 | 374 | 379 | 336 | 377 |

[1] At 36° C.   [2] At 30° C.   [3] Pass.   [4] Cracks.   [5] OK.

TABLE II
[Examples VIII through XIX]

| Example | VIII | IX | X | XI | XII | XIII | XIV | XV | XVI | XVII | XVIII | XIX |
|---|---|---|---|---|---|---|---|---|---|---|---|---|
| Mylar, gms | 240.0 | 209.4 | 163.5 | 222.0 | 181.0 | 119.9 | 204.0 | 152.8 | 76.4 | 165.85 | 165.85 | 165.85 |
| Butanediol, gms | 10.8 | 9.5 | 7.4 | 10.0 | 8.1 | 5.4 | 9.2 | 6.9 | 3.4 | 7.43 | 7.43 | 7.43 |
| Trimellitic anhydride, gms | 118.8 | 118.8 | 118.8 | 158.4 | 158.4 | 158.4 | 197.9 | 197.9 | 197.9 | 158.4 | 158.4 | 158.4 |
| Methylene dianiline, gms | 61.12 | 92.1 | 138.0 | 81.6 | 122.6 | 183.7 | 102.1 | 153.3 | 229.7 | 137.75 | 137.75 | 137.75 |
| Total tris (2-hydroxyethyl) isocyanurate, gms | 180.0 | 180.0 | 180.0 | 138.0 | 138.0 | 138.0 | 96.0 | 96.0 | 96.0 | 151.8 | 165.6 | 138.0 |
| Antimony oxide, gms | 0.86 | 0.80 | 0.70 | 0.74 | 0.65 | 0.53 | 0.612 | 0.51 | 0.35 | 0.612 | 0.612 | 0.612 |
| Total NJ-150, gms | 40.0 | 40.0 | 40.0 | 40.0 | 40.0 | 40.0 | 40.0 | 40.0 | 40.0 | 40.0 | 4.00 | 40.0 |
| 50% wt. phenol, 50% wt. cresylic acid gms | 1,050.0 | 1-050.0 | 1,050.0 | 1,050.0 | 1,050.0 | 1,050.0 | 1,050.0 | 1,050.0 | 1,050.0 | 1,050.0 | 1,050.0 | 1,050.0 |
| NJ-100 gms | 310.0 | 310.00 | 310.0 | 310.0 | 310.0 | 310.0 | 310.0 | 310.0 | 310.0 | 310.0 | 310.0 | 310.0 |
| Total glycol, water, c.c. | 42.0 | 36.0 | 45.0 | 31.0 | 36.0 | 42.0 | 33.0 | 36.0 | 42.0 | 44.0 | 43.0 | 43.0 |
| Appearance | Clear | Clear | Cloudy | Clear | Clear | Cloudy | Clear | Clear | Cloudy | Clear | Clear | Clear |
| Viscosity at 30° C., cps | 880 | 980 | 690 | 810 | 1,230 | 670 | 820 | 730 | 860 | 750 | 1,050 | 1,380 |
| Tyzor PB, gms | 6.0 | 6.0 | 6.0 | 6.0 | 6.0 | 6.0 | 6.0 | 6.0 | 6.0 | 6.0 | 6.0 | 6.0 |
| RS-228, gms | 21.0 | 21.0 | 21.0 | 18.0 | 18.0 | 18.0 | 15.0 | 15.0 | 15.0 | 18.0 | 18.0 | 18.0 |
| Polyhydantoin, gms | 0.0 | 0.0 | 0.0 | 0.0 | 0.0 | 0.0 | 0.0 | 0.0 | 0.0 | 0.0 | 0.0 | 16.6 |

TABLE III

| | Standard | | | | | | | | | | | | | Standard |
|---|---|---|---|---|---|---|---|---|---|---|---|---|---|---|
| Speed, ft./min | 33 | 33 | 33 | 33 | 33 | 33 | 33 | 33 | 33 | 33 | 33 | 33 | 33 | 33 |
| Enamel, example | Izsomid | VIII | IX | X | XI | XII | XIII | XIV | XV | XVI | XVII | XVIII | XIX | Omega |
| Viscosity, cps. at 30% | 800 | 880 | 980 | 690 | 810 | 1230 | 670 | 820 | 730 | 860 | 750 | 1,050 | 1,380 | 850 |
| Solids, percent | 30 | 30 | 30 | 30 | 30 | 30 | 30 | 30 | 30 | 30 | 30 | 30 | 30 | 30 |
| Surface rating | 1.3 | 1.4–1.5 | 1.2–1.3 | 1.3–1.4 | Blistered | 1.2 | 1.6 | 1.6 | 1.8 | 1.4 | 1.7 | 1.3 | 1.0 | 1.2–1.3 |
| Build, mils | 2.9–3.1 | 2.8–3.0 | 3.0 | 3.0–3.1 | 2.8–3.0 | 2.7–2.9 | 2.8–3.1 | 3.0–3.2 | 3.1–3.2 | 2.9–3.1 | 3.0–3.1 | 3.0–3.2 | 2.9–3.0 | 2.8–3.0 |
| Flexibility: Elongation, percent | 35 | 34 | 36 | 35 | 35 | 34 | 35 | 33 | 33 | 36 | 33 | 32 | 33 | 33 |
| Mandrel flex., 25%-1X | OK | OK | OK | OK | OK | OK | Fail | OK | OK | Fail | OK | 1/40 | OK | OK |
| Snap | OK | OK | OK | OK | OK | OK | OK | OK | OK | OK | OK | OK | OK | OK |
| Heat shock: 20%–3X 200° C | Pass | Fail | Fail | Pass | 8/40 | Pass | 1/40 | 1/40 | Pass | 1/40 | Pass | Pass | Pass | Pass |
| 20%–3X 220° C | Pass | Fail | Fail | 1/40 | 12/40 | 3/40 | Pass | 1/40 | Pass | 1/40 | Pass | 3/20 | Pass | Pass |
| Reliance 40 a. burnout, mins | 1.7 | 2.6 | 1.5 | 1.6 | 2.8 | 1.6 | 1.9 | 2.0 | 2.1 | 1.5 | 1.8 | 1.7 | 1.7 | 1.7 |
| NEMA cut-thru, °C | 383 | 367 | 378 | 379 | 337 | 346 | 381 | 283 | 304 | 340 | 346 | 345 | 340 | 373 |

The method of the invention provides an improved method of processing polyester resin materials. The method of the invention also provides an improved method of manufacturing modified polyester resin materials of the types above-mentioned. Such materials are suitable for application to articles as a coating in accordance with the method of the invention. The method of the invention has applicability for the manufacture of magnet wire and other coated articles.

While there have been described above the principles of this invention in connection with specific chemistry, it is to be clearly understood that this description is made only by way of example and not as a limitation to the scope of the invention.

What is claimed is:

1. A method comprising the steps of (a) forming a mixture consisting essentially of a preformed essentially linear film or fiber forming polyester resin material and a diol having less than 4 carbon atoms, the molar amount of diol in said mixture being less than 15 times the molar amount of said resin material in said mixture, (b) reacting said resin material with said diol thereby forming a mixture of reaction products having reactive groups therein consisting of ester and hydroxyl groups and having a lower molecular weight than said resin material, and (c) reacting said mixture of reaction products with a compound having therein at least two groups selected from the group consisting of hydroxyl, amine, carboxylic acid, carboxylic acid anhydride, isocyanate and ester groups thereby forming a modified polyester resin material, with the proviso that when said compound is one having therein at least two hydroxyl groups it is a compound other than said diol of steps (a) and (b), said reacting steps (b) and (c) being carried out at atmospheric pressure and a temperature ranging from about 180° C. to about 260° C., said reacting steps (b) and (c) continuing until said modified polyester resin material in a solution consisting of 30% weight resin and 70% weight solvent has a viscosity of about 600 to about 1400 centipoises at 30° C., said solvent essentially consisting of 37.5% weight cresylic acid and 37.5% weight phenol and 25% weight aromatic hydrocarbon petroleum distillate solvent having a distillation range at 760 millimeters of mercury of from about 155° C. to about 210° C. as measured by ASTM Method D850.

2. The method of claim 1 wherein said reacting step (c) includes the step of reacting said reaction products with an amine having at least two amine groups.

3. The method of claim 2 wherein said resin material is a poly(ethylene terephthalate), said reacting step (c) also includes the step of reacting said mixture of reaction products with a compound of the group consisting of carboxylic acids having at least two acid groups and the anhydrides thereof.

4. The method of claim 3 wherein said reacting step (c) includes the step of forming a mixture of said amine and compound and said mixture of reaction products, the molar amount of said compound in said mixture being less than twice the molar amount of amine in said mixture thereby forming a polyamide-imide-ester resin material.

5. The method of claim 2 further comprising the steps of applying a solution of the product of claim 2 in a solvent therefor to an article, and eliminating the solvent from said solution.

6. The method of claim 1 wherein the compound of said reacting step (c) has at least three reactive groups thereby forming a thermosettable polyester resin material.

7. The method of claim 6 wherein said resin material is a poly(ethylene terephthalate) and said compound of step (c) is one of the group consisting of tris(2-hydroxyethyl) isocyanurate and tri(tolylene isocyanate) isocyanurate.

8. The method of claim 1 further comprising the steps of applying a solution of said modified polyester resin material in a solvent therefor to an article, and eliminating the solvent from said solution.

9. The method of claim 8 wherein said article is an electrical conductor, and said conductor is coated with said modified polyester resin material.

10. The method of claim 6 further comprising the steps of applying a solution of said thermosettable resin material in a solvent therefor to an article and eliminating the solvent from said solution.

11. The method of claim 10 wherein said article is an electrical conductor, and said conductor is coated with said thermosettable resin material.

12. A modified polyester resin material made in accordance with the method of claim 4 comprising less than about 55% weight imide and less than about 25% weight amide.

13. A modified polyester resin material made in accordance with the method of claim 7 comprising from about 14% weight to about 33% by weight of tris (2-hydroxyethyl) isocyanurate.

14. An article of manufacture made in accordance with the method of claim 8.

15. An article of manufacture made in accordance with the method of claim 10.

16. The method of claim 1 wherein said reacting step (c) comprises the steps of forming a mixture comprising an amine having at least two amine groups and a compound of a group consisting of carboxylic acids having at least two acid groups and the anhydrides thereof and said mixture of reaction products of reacting step (b), the molar amount of said last-mentioned compound being at least twice the molar amount of said amine, and (d) reacting said mixture of reaction products with said amine and said compound thereby forming a polyimide-ester-resin material.

17. The method of claim 16 further comprising the steps of applying a solution of said polyimide-ester-resin material in a solvent therefor to an article, and eliminating the solvent from said solution.

18. An article of manufacture made in accordance with the method of claim 17.

References Cited

UNITED STATES PATENTS

| | | | |
|---|---|---|---|
| 2,333,639 | 11/1943 | Christ et al. | 260—75 |
| 2,547,113 | 4/1951 | Drewitt et al. | 260—75 |
| 2,691,006 | 10/1954 | Flory | 260—45.4 |
| 3,000,849 | 9/1961 | Clachan et al. | 260—45.4 |
| 3,211,585 | 10/1965 | Meyer et al. | 117—232 |
| 3,246,002 | 4/1966 | Gagliardi et al. | 260—299 |
| 3,255,068 | 6/1966 | Smith | 161—190 |
| 3,305,495 | 2/1967 | Vom Orde | 260—2.3 |
| 3,369,010 | 2/1968 | Kelley | 260—86.1 |
| 3,397,253 | 8/1968 | Merten et al. | 260—830 |
| 3,437,500 | 4/1969 | Hening et al. | 106—252 |
| 3,448,084 | 6/1969 | Burdick et al. | 260—75 |
| 2,936,296 | 5/1960 | Precopio et al. | 2660—33.4 |
| 3,446,758 | 5/1969 | Wiener | 260—2.3 |
| 3,453,240 | 7/1969 | Plaster et al. | 260—75 |
| 3,342,780 | 9/1967 | Meyer et al. | |
| 3,555,113 | 1/1971 | Sattler | 260—841 |

FOREIGN PATENTS

| | | |
|---|---|---|
| 678,282 | 9/1966 | Belgium. |
| 125,382 | 10/1959 | U.S.S.R. |

DONALD E. CZAJA, Primary Examiner

H. S. COCKERAM, Assistant Examiner

U.S. Cl. X.R.

260—75 N, 75 T, 77.5 AN, 77.5 NC